United States Patent Office 3,432,123
Patented Mar. 11, 1969

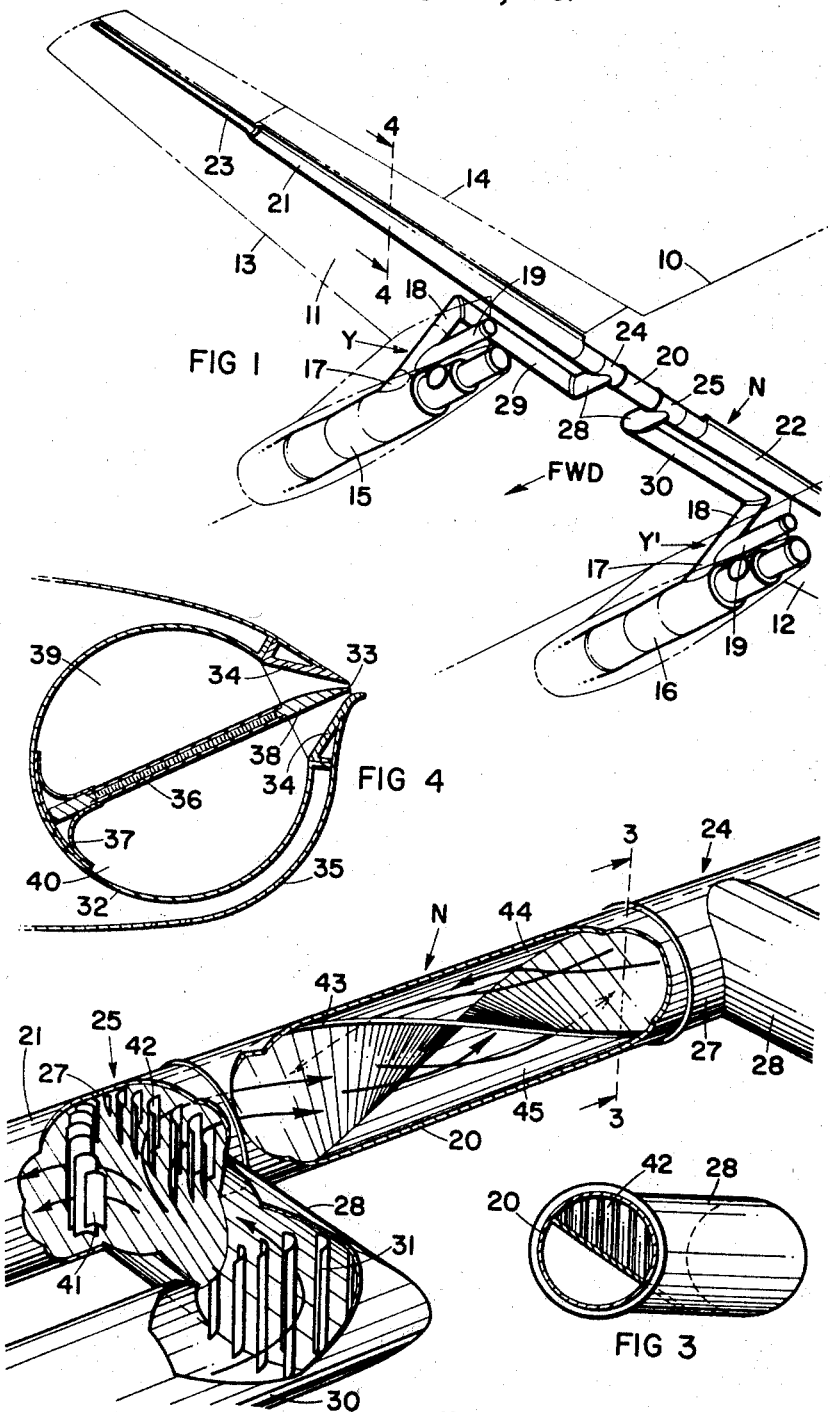

3,432,123
CROSS DUCTING SYSTEM FOR AUGMENTOR WING AIRCRAFT
John Albert Conway, Milton, Ontario, and Cedric Chaffer Barker, Etobicoke, Ontario, Canada, assignors to The Dehavilland Aircraft of Canada, Limited
Filed Apr. 3, 1967, Ser. No. 627,749
U.S. Cl. 244—53
Int. Cl. B64b 1/24; B64c 3/38
4 Claims

ABSTRACT OF THE DISCLOSURE

This specification discloses a cross ducting system for installation in an augmentor wing aircraft having a pair of jet engines which generate bypass air with the system comprising a pair of Y ducts one for each engine, with the stem of each Y being connected to an engine, a diverter where the two legs join the stem, a pair of lateral ducts, each being connected to a leg of a Y; and a span wise nozzle duct unit extending across the trailing edges of both wings and consisting of a tubular casing of circular cross section in which is positioned a splitter plate that is twisted at the center to provide, in effect, four nozzle ducts, two for each wing. The casing has an exhaust slot extending throughout its length and the splitter plate carries nozzle blocks which enter the slot providing an exhaust slot for each of the nozzle ducts. Each lateral duct is connected to the casing and diffuser vanes are located at the joinder to direct air in opposite directions in the casing. The nozzle casing has blowing ducts extending over the ailerons.

---

The present invention has to do with jet powered augmentor wing aircraft and is concerned primarily with a cross ducting system which provides a compact nozzle duct unit across the trailing edges of both wings and ducts connecting both engines of a twin engine aircraft to the nozzle ducts of the nut in a symmetrical manner which is maintained when an engine fails with the relation of the cross sectional area of the nozzle ducts to an engine remaining in operation also being maintained constant.

An augmentor wing aircraft includes, as a characteristic element, a nozzle duct which extends across the trailing edge of each wing. Bypass air from the jet engines is conducted to these nozzle ducts and when discharged through an exhaust slot therein generates the lift and thrust which is the purpose of the augmentor wings. It is evident that upon failure of an engine in a twin engine aircraft it is desirable to maintain symmetry of operation in both wings for the remaining engine.

The nozzle ducts are designed with a cross sectional area that is related to the pressure of bypass air generated by the engines. It is also desirable to maintain this relation upon failure of an engine. It is also desirable to maintain this relation upon failure of an engine. It is also desirable, if not absolutely essential to provide for a compact construction in the nozzle ducts because of the space limitations engendered by the thickness of the wings at their trailing edges.

With these conditions in mind, the invention has, as an important object the provsion, in a twin engine, jet powered augmentor wing aircraft, a cross ducting system comprising a nozzle duct unit that is assembled across the wings at their trailing edges and which afford, what is in effect, four nozzle ducts, two for each wing. This nozzle duct unit is connected to both engines of the aircraft.

Another object is to provide, in a cross ducting system of the type noted, a nozzle duct unit comprising a tubular casing housing a splitter plate which is twisted at the center to provide the four ducts aforesaid. The casing is formed with a longitudinally extending slot and the twisted plate carriers nozzle blocks which extend into the slot to provide an exhaust slot for each of the nozzle ducts.

Obviously the nozzle duct unit must be connected to the engines to receive bypass air therefrom. Thus another object is to provide, in a cross ducting system of the character indicated, a pair of Y ducts, one for each engine. The stem of each Y is connected to an engine and one leg of each Y to the casing of the nozzle duct unit. The other leg of each Y is directed to the main jet stream of the aircraft. A diverter is positioned in each Y at the joinder of the stem to the legs to direct bypass air into one leg to the exclusion of the other.

A lateral duct connects a leg of each Y to the nozzle duct unit casing. Another object is to provide air diffusing means at the joinder of each lateral duct to the casing.

Another object is to provide, in a cross ducting system of the type noted, extensions on the nozzle duct unit casing which extend over the ailerons and which extensions constitute blower ducts for the ailerons.

The invention therefore comprises a cross ducting system for twin jet engine augmentor wing aircraft and which system includes: a pair of Y ducts; a nozzle duct unit consisting of a tubular casing with a divider plate therein that is twisted at the center to provide four nozzle ducts, a longitudinal slot in the casing into which projects two nozzle blocks carried by the twisted plate; lateral ducts connecting a leg of each Y ducts to the nozzle duct unit casing; and air diffusers where the lateral ducts are connected to the casing.

Various other more detailed objects and advantages of the invention, such as arise in connection with carrying out the above noted ideas in a practical embodiment, will in part become apparent, and in part be hereinafter stated, as the description of the invention proceeds.

For a full and more complete understanding of the invention reference may be had to the following description and accompanying drawing, wherein:

FIGURE 1 is a perspective of a portion of an augmentor wing aircraft including the cross duct system of this invention.

FIGURE 2 is a perspective, on an enlarged scale, of the central portion of the cross duct system.

FIGURE 3 is a transverse section through the nozzle duct unit, at the location of a diffuser, being taken about on the plane represented by the line 3—3 of FIGURE 2; and FIGURE 4 is a transverse section on an enlarged scale through the nozzle duct unit substantially midway of a wing, being taken about on the plane represented by the line 4—4 of FIGURE 1.

Referring now to the drawing, wherein like reference characters denote corresponding parts, and first more particularly to FIGURE 1 an augmentor wing aircraft of the type with which this invention is concerned is shown as including a fuselage 10 disposed in the position indicated by the arrow Fwd. Extending outwardly from opposite sides of the fuselage 10 are wings 11 and 12. Each of these wings has a leading edge 13 and a trailing edge 14. Mounted on the wing 11 is a jet engine 15 and another jet engine 16 is carried by the wing 12. The jet engines 15 and 16 generate bypass air in a manner well known in the art.

A pair of Y ducts are indicated generally at Y and Y'. Each of these Y ducts has a stem 17 and legs 18 and 19. The stem 17 of the duct Y communicates with the engine 15 while the stem of the duct Y' communicates with the engine 16. Each of the legs 19 is directed to the main jet stream of the aircraft. A diverter (not illustrated) is included in each Y duct where the stem 17 joins the legs 18 and 19. Diverters of this type are well known and consist of a hingedly mounted flap valve together with suitable operating members. Being so well known it is believed unnecessary to encumber this application by any further disclosure thereof.

Extending across the wings 11 and 12 adjacent to the trailing edges 14 is a nozzle duct unit identified in its entirety by the reference character N. The unit N comprises a central section 20 which is tubular and of circular cross section; wing sections 21 and 22, and blower duct extensions 23 which extend onto the ailerons at the ends of the wings 11 and 12. The wing section 21 is connected to the center section 20 by a T shaped connector 24 and a similar T shaped connection 25 connects the wing section 22 to the center section 20.

Each of the T shaped connections 24 and 25 has a cross head 27 of cylindrical formation and a stem 28 also of cylindrical shape. The leg 18 of duct Y is connected to the stem 28 of T connection 24 by a lateral duct 29. Likewise a lateral duct 30 connects the leg 18 of duct Y' with the stem 28 of the T connection 25. The lateral ducts 29 and 30 meet the ends of stem 28 in a right angular relation and mounted in each jointure is an assembly of vanes 31 (FIG. 2) which direct bypass air around the bends.

The wing sections 21 and 22 are of generally cylindrical formation as depicted in FIGURE 4 and each comprises a tubular casing 32 having a longitudinally extending slot 33 at the side adjacent to the trailing edge. This slot may be defined by converging plates 34 that are secured, as by welding at their more widely spaced ends to the casing 32. Portions of the wing skin are shown at 35 and are also welded to the plates 34 adjacent to the slot 33.

A splitter plate 36 is positioned in the bore of the casing 32 and an end edge is anchored thereto by the anchoring device 37. At the edge opposite to the anchoring device 37 each splitter plate 36 carries a nozzle block 38 which extends into the space between the plates 34 and divides the slot 33 into two exhaust slots, one for each of the nozzle ducts 39 and 40 which are formed by the splitter plate 36 and the casing 32.

Each of the cross heads 27 of the T shaped connectors is provided with two sets of vanes 41 and 42 (FIG. 2). It is evident that the vanes 41 direct air from the stems 28 outwardly to the wing sections and the vanes 42 direct such air inwardly to the center section 20.

The center section 20 is provided with a so-called "twisted splitter plate" 43 which co-operates with the tubular casing of the section 20 to define two screw-like chambers 44 and 45. Thus the chamber 44 connects the nozzle duct 39 of wing section 21 with the nozzle duct 40 of wing section 22. Likewise the chamber 45 connects the nozzle duct 39 of wing section 22 with the nozzle duct 40 of wing section 21.

It is evident that the construction above described provides what is, in effect, four nozzle ducts each having an exhaust slot. One nozzle duct in each wing is connected to receive bypass air from one engine while the other nozzle duct in each of the wings receives bypass air from the other engine.

During normal cruising speeds the diverters in the Y ducts are positioned to direct bypass air from the engines 15 and 16 into the legs 19 and thence into the main jet stream. When the augmentor devices, of which the nozzle unit N is a part, are to be rendered effective the diverters are positioned to direct the bypass air into the legs 18. From the latter it passes through the lateral ducts 29 and 30, T connectors 24 and 25, and center section 20 to the nozzle ducts 39 and 40 in the wing sections 21 and 22.

Should one of the engines 15 or 16 fail, the remaining engine delivers bypass air under proper pressure to one of the nozzle ducts in each wing section. Thus symmetry is maintained as is the proper relation between the cross section of the nozzle ducts and the pressure of bypass air generated by the engines.

While preferred specific embodiments of the invention are hereinbefore set forth it is to be clearly understood that the invention is not to be limited to the exact constructions, mechanisms, and designs illustrated and described because various modifications of these details may be provided in putting the invention into practise.

We claim:
1. In an augmentor wing aircraft including a fuselage, a wing outstanding from each side of said fuselage and having a trailing edge, and a jet engine on each wing developing bypass air, the improvement consisting of: a nozzle duct unit extending across the trailing edges of both of said wings and including four nozzle ducts each having an exhaust slot; a cross ducting system connecting each engine with a pair of said nozzle ducts, one on one wing and one on the other, said nozzle ducts being defined by a tubular casing housing a cross ducting splitter plate that is twisted at the center, said casing having a longitudinally extending slot; and a pair of nozzle blocks extending into said slot to define the exhaust slots aforesaid.

2. The ducting system of claim 1 together with air diffusers at the joinders of said cross ducting system to said nozzle ducts.

3. The ducting system of claim 1 in which the cross ducting system includes a pair of Y ducts each having a stem connected to an engine and a leg connected to the nozzle duct unit, together with a second leg of each Y duct directed to the main jet stream of the aircraft and a diverter in each Y at the joinder of the stem to the legs.

4. The ducting system of claim 1 together with a blower duct extension at each end of said nozzle duct unit and extending over the ailerons of the aircraft.

References Cited

UNITED STATES PATENTS

| | | | |
|---|---|---|---|
| 2,912,189 | 11/1959 | Pouit | 244—42 |
| 2,954,944 | 10/1960 | Huet | 244—42 X |
| 3,161,377 | 12/1964 | Balluff | 244—52 |
| 3,216,675 | 11/1965 | Snell | 244—52 |
| 3,259,340 | 7/1966 | Whittley | 244—42 |
| 3,266,752 | 8/1966 | Mortlock et al. | 244—55 |
| 3,347,495 | 10/1967 | Eberhardt et al. | 244—42 |

MILTON BUCHLER, *Primary Examiner.*

J. E. PITTENGER, *Assistant Examiner.*

U.S. Cl. X.R.

244—42